(12) United States Patent
Reichert

(10) Patent No.: US 8,225,921 B2
(45) Date of Patent: Jul. 24, 2012

(54) PARKING LOCK FOR A TRANSMISSION

(75) Inventor: Heinz Reichert, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 741 days.

(21) Appl. No.: 12/374,116

(22) PCT Filed: Jun. 29, 2007

(86) PCT No.: PCT/EP2007/056538
§ 371 (c)(1),
(2), (4) Date: Jan. 16, 2009

(87) PCT Pub. No.: WO2008/012168
PCT Pub. Date: Jan. 31, 2008

(65) Prior Publication Data
US 2009/0314604 A1    Dec. 24, 2009

(30) Foreign Application Priority Data
Jul. 22, 2006    (DE) .......................... 10 2006 033 985

(51) Int. Cl.
*B60W 10/18*    (2012.01)
*B60T 1/02*    (2006.01)
(52) U.S. Cl. ........................ 192/219.5; 188/69; 74/411.5
(58) Field of Classification Search ............... 192/219.5; 188/31, 69; 74/411.5
See application file for complete search history.

(56) References Cited

U.S. PATENT DOCUMENTS

| | | | | |
|---|---|---|---|---|
| 2,875,856 A | * | 3/1959 | Mrlik et al. | ...................... 188/69 |
| 3,539,039 A | * | 11/1970 | Chana | ......................... 192/219.5 |
| 3,601,231 A | | 8/1971 | Kolacz et al. | |
| 4,606,242 A | | 8/1986 | Hasegawa et al. | |
| 5,685,406 A | | 11/1997 | Crum et al. | |
| 5,794,748 A | | 8/1998 | Heuver et al. | |
| 5,934,436 A | | 8/1999 | Raszkowski et al. | |
| 2001/0042669 A1 | | 11/2001 | Arakawa | |
| 2004/0211288 A1 | * | 10/2004 | Franze et al. | ................... 74/575 |

FOREIGN PATENT DOCUMENTS

| | | |
|---|---|---|
| DE | 197 44 238 A1 | 4/1998 |
| DE | 199 33 618 A1 | 1/2001 |
| EP | 0 823 359 A1 | 2/1998 |
| JP | 03-086660 | 4/1991 |

* cited by examiner

*Primary Examiner* — David D Le
*Assistant Examiner* — Terry Chau
(74) *Attorney, Agent, or Firm* — Davis & Bujold, P.L.L.C.

(57) ABSTRACT

A transmission parking lock with a ramp (10) for pressing against an actuating element. The ramp (10) defines an actuation direction (11) in which the actuating element can be moved and the ramp (10) has a ramp gradient in the actuation direction (11). The ramp gradient varies transversely with respect to the actuation direction (11) such that the load between a pawl (1) and of the actuating element can be reduced.

17 Claims, 5 Drawing Sheets

PARKING LOCK FOR A TRANSMISSION

This application is a National Stage completion of PCT/EP2007/056538 filed Jun. 29, 2007 which claims priority from German Patent Application Serial No. 10 2006 033 985.1 filed Jul. 22, 2006.

FIELD OF THE INVENTION

The present invention concerns a parking lock of a transmission with a ramp for pressing against an actuating element, the ramp having an actuation direction in which the actuating element can be moved and a ramp gradient in the said actuation direction.

BACKGROUND OF THE INVENTION

From the prior art various parking locks for automatic transmissions are known. For example DE 197 44 238 A1 describes a parking lock with a pawl which can be pivoted from a neutral position to a locking position, in which a detent tooth on the pawl engages in a detent recess on a detent ring on the drive input shaft of a transmission. To pivot the pawl a movable cam element is provided, which, depending on its position, presses against the side of the pawl opposite the detent tooth. In addition a ramp is provided on the pawl, which has a constant ramp gradient in the actuation direction and over the full width of the ramp. In this context the actuation direction is understood to mean the direction in which the cam element moves in order to pivot the pawl to its locking position. In the actuation direction the ramp then merges into a support surface. The ramp serves to enable a uniform and simple movement sequence of the cam element and the pawl. A similar parking lock is also known from DE 199 33 618 A1.

From US 2001/0042669 A1 a similar parking lock is known, in which the ramp against which the cam element presses is formed by a sloping surface at the free end of the pivoting pawl. Furthermore, the pawl is actuated in relation to its pivot axis in the radial direction, so that pawl actuation can also be said to be radial.

The parking locks known from the prior art have the disadvantage that particularly high loads occur at the contact points between the actuating element in the form of a cam or suchlike and the ramp surface, whereby on the one hand the movements of the pawl and the actuating element are made more difficult and on the other hand the functionality of the said components is endangered.

SUMMARY OF THE INVENTION

Accordingly, the purpose of the present invention is to provide a parking lock of a transmission with a ramp to press against an actuating element, in which the loads on the pawl and the actuating element are smaller so that the movement sequences of the said components can take place simply and long-lasting functionality is ensured.

The transmission parking lock according to the invention comprises a ramp against which an actuating element can be pressed in order to pivot the pawl. The ramp can for example be made integrally with the pawl by providing a corresponding inclined surface on the pawl. Alternatively or in addition, the ramp can also be formed in a guide-plate of a parking lock or a housing. The ramp has an actuation direction. The actuation direction of the ramp is understood to be the predetermined direction in which the actuating element is moved in order to pivot the pawl from a neutral position to a locking position. Further, in this actuation direction the ramp has a ramp gradient. According to the invention, the gradient of the ramp varies transversely with respect to the actuation direction. This means, for example, that the size of the ramp gradient in the actuation direction depends on the position along the width direction of the ramp where the ramp gradient is measured.

Whereas in the prior art the parking lock actuating elements always contact the ramp at one point, which results in larger loads at that point, the result of having a ramp gradient which varies transversely with respect to the actuation direction is that the actuating element, which comprises for example a roller adjacent to the ramp, contacts the ramp simultaneously at two or more points or even along a line. This reduces the load both on the pawl/guide-plate or the housing, and on the adjacent element. Consequently the relative movement of the components is simpler and wear is reduced.

In a preferred embodiment of the parking lock according to the invention, the gradient of the ramp varies continuously transversely to the actuation direction, whereby the advantages mentioned above are obtained with even greater effect.

To obtain linear support of the actuating element on the ramp independently of the pivot position of the parking lock, in a particularly preferred embodiment of the parking lock according to the invention the ramp forms a ramp surface on which the actuating element can be pressed, such that the ramp surface is helicoidal.

In an advantageous embodiment of the parking lock according to the invention the pawl of the parking lock has a bearing at one end, by means of which the pawl can be mounted to the pivot about a pivot axis. The bearing can for example comprise a cylindrical bore by means of which the pawl can be fitted onto a gudgeon pin or suchlike which forms the pivot axis.

In a particularly advantageous embodiment of the parking lock according to the invention the ramp gradient rises on the side of the ramp facing away from the bearing end. This ensures that the actuating element can still contact the ramp or ramp surface along a line even when the pawl of the parking lock is pivoted to different pivot positions.

In a further preferred embodiment of the parking lock according to the invention the actuation direction of the ramp extends parallel to the pivot axis of the pawl produced with the help of the bearing end. Thus, the pawl with its ramp is designed for a parking lock with axial pawl actuation.

To prevent further swivelling of the pawl by the actuating element once the locking position has been reached, in another advantageous embodiment of the parking lock according to the invention a flat supporting surface is provided on the pawl/guide-plate or on the housing, which is connected to the ramp at an angle in the actuation direction. The supporting surface is made flat so that in this area too the actuating element can be supported along a line when the actuating element comprises the cylindrical rollers or suchlike mentioned earlier on the parts adjacent to the supporting surface.

According to a further advantageous embodiment of the parking lock according to the invention the pawl has a detent tooth arranged on the side of the pawl facing away from the ramp and/or supporting surface. Such a detent tooth can for example engage in a detent recess in a parking lock gearwheel on the drive output shaft of a transmission when the pawl is in the locking position.

In a further preferred embodiment of the parking lock according to the invention the flat supporting surface is arranged parallel to the longitudinal direction of the detent tooth.

The transmission parking lock according to the invention for a transmission comprises a pawl and a guide-plate or a housing with a ramp of the type described above, such that the pawl is mounted to pivot about a pivot axis. In addition the parking lock comprises an actuating element which can be moved in the actuation direction of the ramp from a first position, in which the pawl is in a neutral position, through a second position in which the actuating element presses against the ramp in such manner that the pawl pivots to an intermediate position, to a third position in which the pawl has pivoted to a locking position in which the transmission is locked. In the neutral position there is no locking of the transmission.

In a preferred embodiment of the parking lock according to the invention, in the said third position the actuating element is supported on the supporting surface.

In a particularly preferred embodiment of the parking lock according to the invention the actuating element and the ramp are formed and matched to one another in such manner that in the second position the actuating element always presses against the ramp along a line regardless of the pivot position of the pawl. Preferably, this linear support takes place over the full width of the supported portion of the actuating element.

In another, particularly preferred embodiment of the parking lock according to the invention the actuating element comprises at least one roller that can roll on the ramp. This substantially simplifies the relative movement of the pawl and the actuating element with respect to one another. The roller can be made for example as a cylindrical roller.

In a further advantageous embodiment of the parking lock according to the invention a parking lock gearwheel connected in a rotationally fixed manner to the drive output shaft of a transmission is provided, such that in the locking position the pawl is engaged with the said parking lock gearwheel. This reliably prevents any further rotation of the drive output shaft when the pawl is in the locking position.

BRIEF DESCRIPTION OF THE DRAWINGS

Below, the invention is explained in more detail with reference to an example embodiment illustrated in the associated drawings, which show.

DETAILED DESCRIPTION OF THE INVENTION

Figure 1:
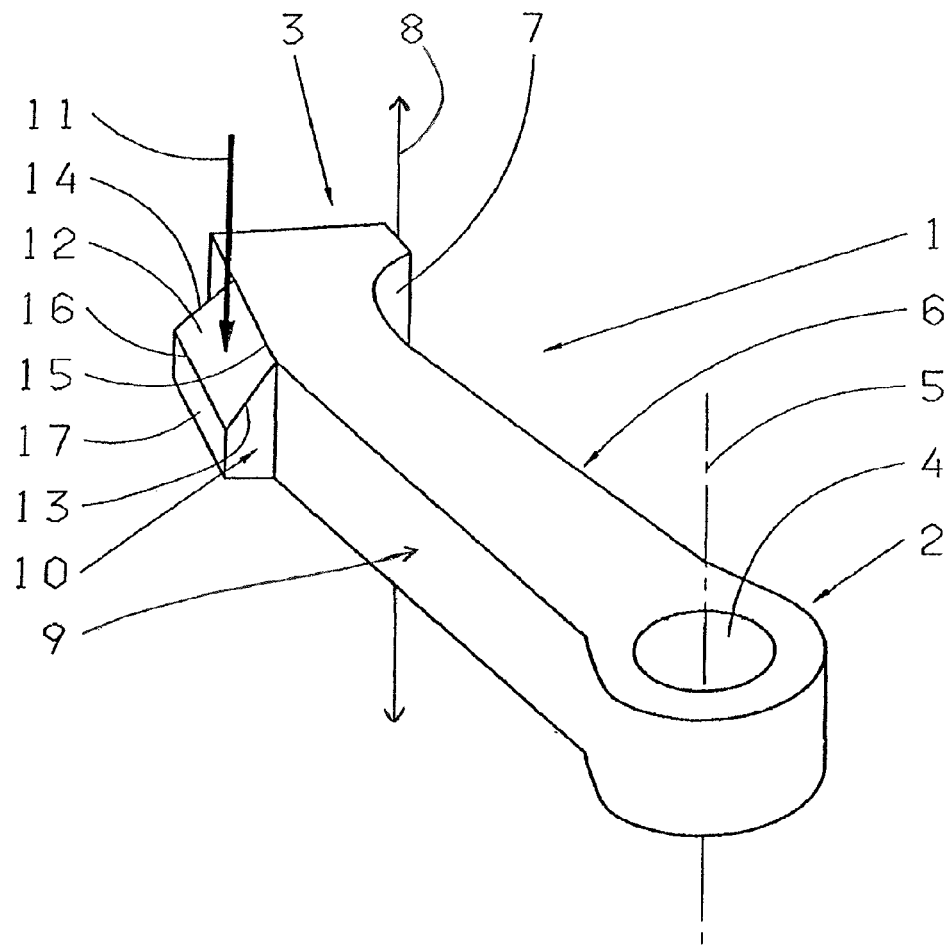
FIG. 1: Perspective view of an embodiment of the parking brake pawl according to the invention.

Below, the embodiment of the pawl 1 according to the invention for the transmission parking lock will be described first, with reference to FIGS. 1 and 2. The pawl 1 is made as an elongated lever with a bearing end 2 and a free end 3 in the assembled condition. In the bearing end 2 is provided a cylindrical, through-going bore 4 by means of which the pawl 1 can be mounted on a gudgeon pin (not shown) or suchlike, so that the pawl 1 can pivot about a pivot axis indexed as 5 in the figures.

In the area of the free end 3, on one side 6 of the pawl 1 an elongated detent tooth 7 is provided, the longitudinal direction 8 of this detent tooth 7 extending parallel to the pivot axis 5. On the other side 8 of the pawl 1, the side facing away from 7, is arranged a ramp 10. The ramp 10 serves to press against an actuating element in order to pivot the pawl 1 about its pivot axis 5, as will be explained later with reference to FIGS. 3 to 5. For this purpose the ramp 10 has a predetermined actuation direction 11, in which the actuating element has to be moved. The actuation direction 11 of the ramp 10 is understood to be the predetermined direction in which the actuating element is moved in order to pivot the pawl from a neutral position to a locking position. The ramp 9 forms a ramp surface 12 which, relative to the actuation direction, is bounded by two lateral edges 13, 14, a front edge 15 and a rear edge 16. The ramp surface 12 is inclined relative to the actuation direction 11, so that the ramp 9 has a ramp gradient in the actuation direction 11.

In this case the ramp 9 has a ramp gradient in the actuation direction 10 which varies transversely with respect to the actuation direction 11, i.e. from one lateral edge 13 to the other lateral edge 14 in the width direction, as explained further below with reference to FIG. 2. The ramp gradient varies continuously. In the present embodiment this is achieved in that the ramp surface 12 against which the actuating element can be pressed is formed as a helical surface between the two lateral edges 13, 14. Thus, one lateral edge 13 has a gradient angle $\alpha_1$ relative to the actuation direction 11 while the other lateral edge 14 has a gradient angle $\alpha_4$ relative to the actuation direction 11, $\alpha_4$ being larger than $\alpha_1$. The ramp gradient consequently increases towards the side of the ramp 10 facing away from the bearing end 2. In the area between the lateral edges 13, 14, by virtue of the helically formed ramp surface 12 the ramp gradient adopts values between the gradient angles $\alpha_1$ and $\alpha_4$, as illustrated for example by the gradient angles $\alpha_2$ and $\alpha_3$ in FIG. 2. For these, $\alpha_4 > \alpha_3 > \alpha_2 > \alpha_1$.

Figure 2:
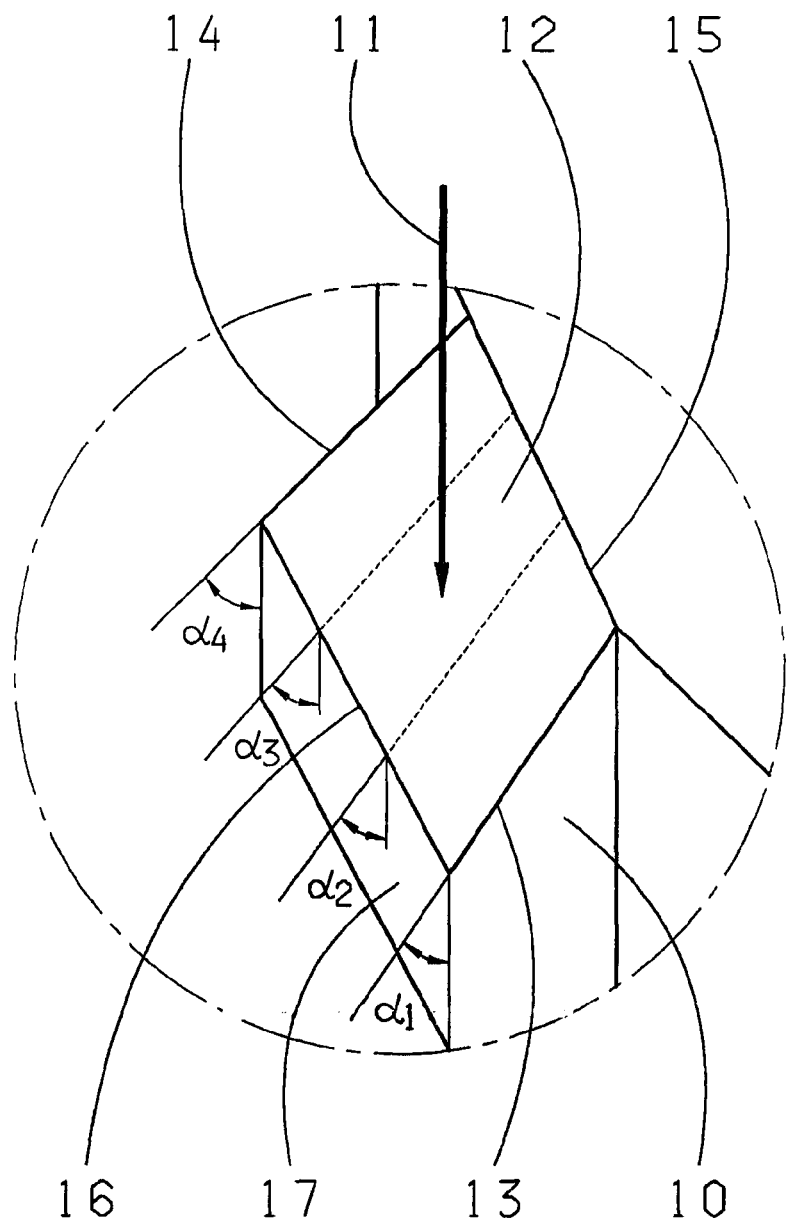
FIG. 2: Enlarged view of the ramp of the pawl in FIG. 1.

The actuation direction 10 of the ramp 9 runs parallel to the pivot axis 5 of the pawl that can be produced with the help of the bearing end 2, as can be seen in FIG. 1. Consequently, this is a pawl 1 designed for a parking brake with axial pawl actuation. The rear edge 16 of the ramp surface 12 is connected to a flat supporting surface 17 directed at an angle to the ramp surface 12 and extending parallel to the longitudinal direction 8 of the detent tooth 7.

Below, an embodiment of the parking brake 18 with the pawl according to FIGS. 1 and 2 will be described with reference to FIGS. 3 to 5. Besides the pawl 1 the parking brake 18 comprises an actuating element 19. The actuating element 19 comprises a push/pull rod 20 by means of which a roller assembly 21 arranged at the end of the said push/pull rod 20 can be moved in the actuation direction 11. The roller assembly 21 comprises a first cylindrical roller 22 and a second cylindrical roller 23, which are arranged transversely to the actuation direction 11, parallel to one another and which rotate in the roller assembly 21. The first roller 22 is supported against a housing 24 of a transmission or of the parking brake 18, while the second roller 23 faces toward the ramp 10 of the pawl. The side 6 of the pawl 1 faces toward the circumference of a parking lock gearwheel 27 attached rotationally fixed to the drive output shaft 28 of a transmission (not illustrated).

Figure 3:
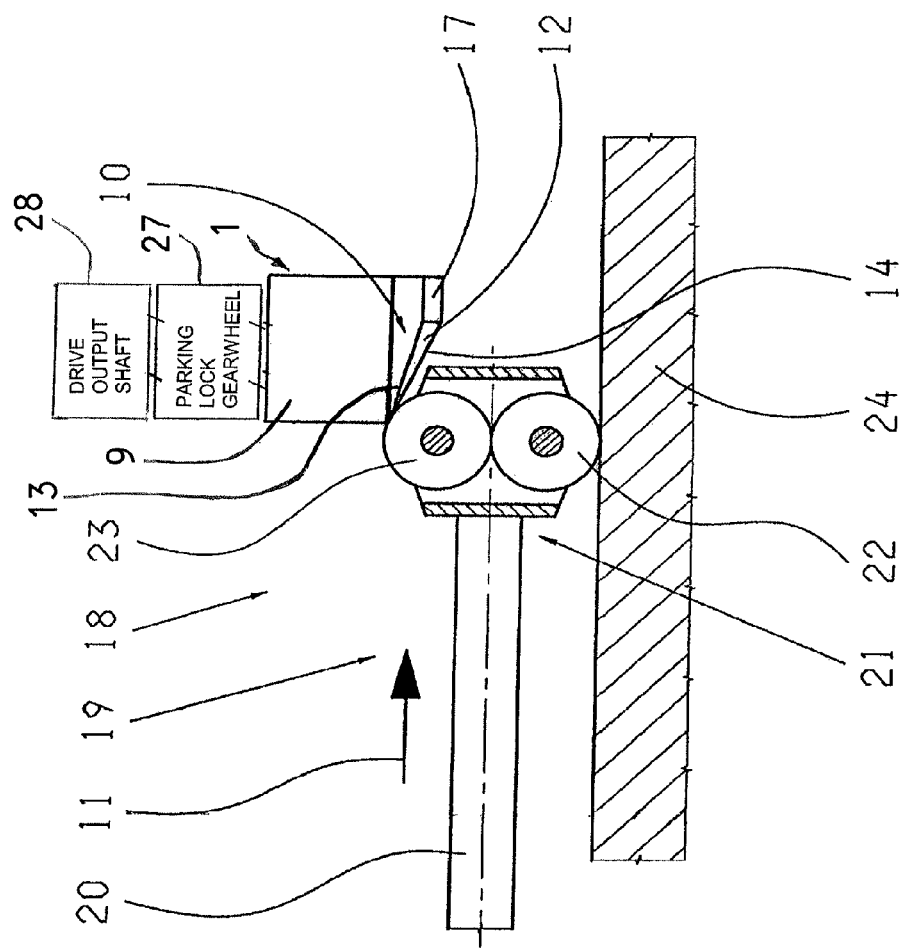
FIG. 3: Partial side view of a parking lock with the pawl shown in FIGS. 1 and 2, the actuating element being pushed to a first position while the pawl is pivoted to its neutral position.

In FIG. 3 the actuating element 19 is in a first position. In this position the second roller 23 exerts no pressure on the ramp 10 or ramp surface 12.

Figure 4:
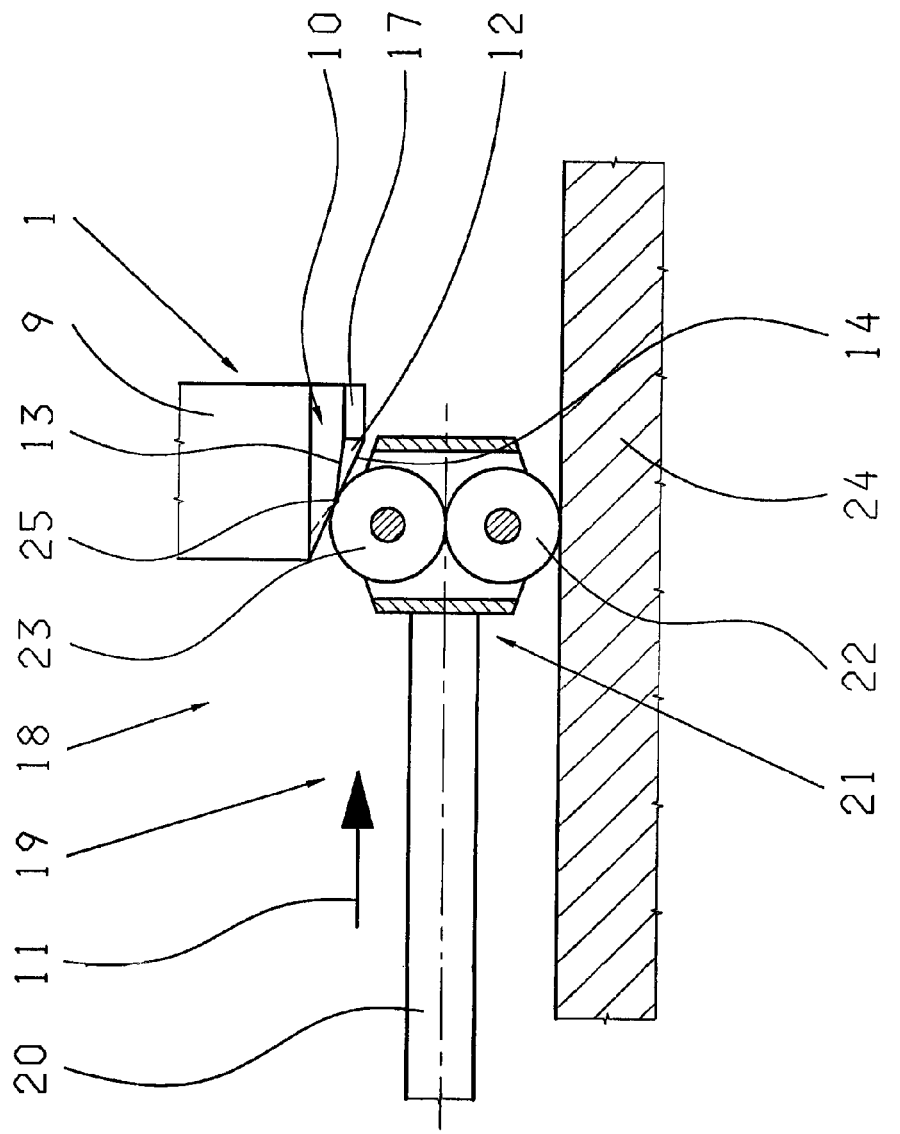
FIG. 4: The parking lock of FIG. 3, with the actuating element pushed to a second position while the pawl is pivoted to an intermediate position.

Now, the actuating element 19 is moved in the actuation direction 11 to a second position, shown in FIG. 4. In this second position the second roller 23 presses against the ramp surface 12 of the pawl 1, so that the pawl 1 pivots about a pivot axis 5 to an intermediate position. During this the second roller 23 rolls along the ramp surface 12. Thanks to the fact that the ramp surface 12 is made as a helical surface, in the second position of the actuating element 19 the second roller 23 always rests on the ramp surface 12 along a line regardless of the actual pivot position of the pawl 1, as indicated by the straight line 25 extending along the normal to the plane of the drawing.

Figure 5:
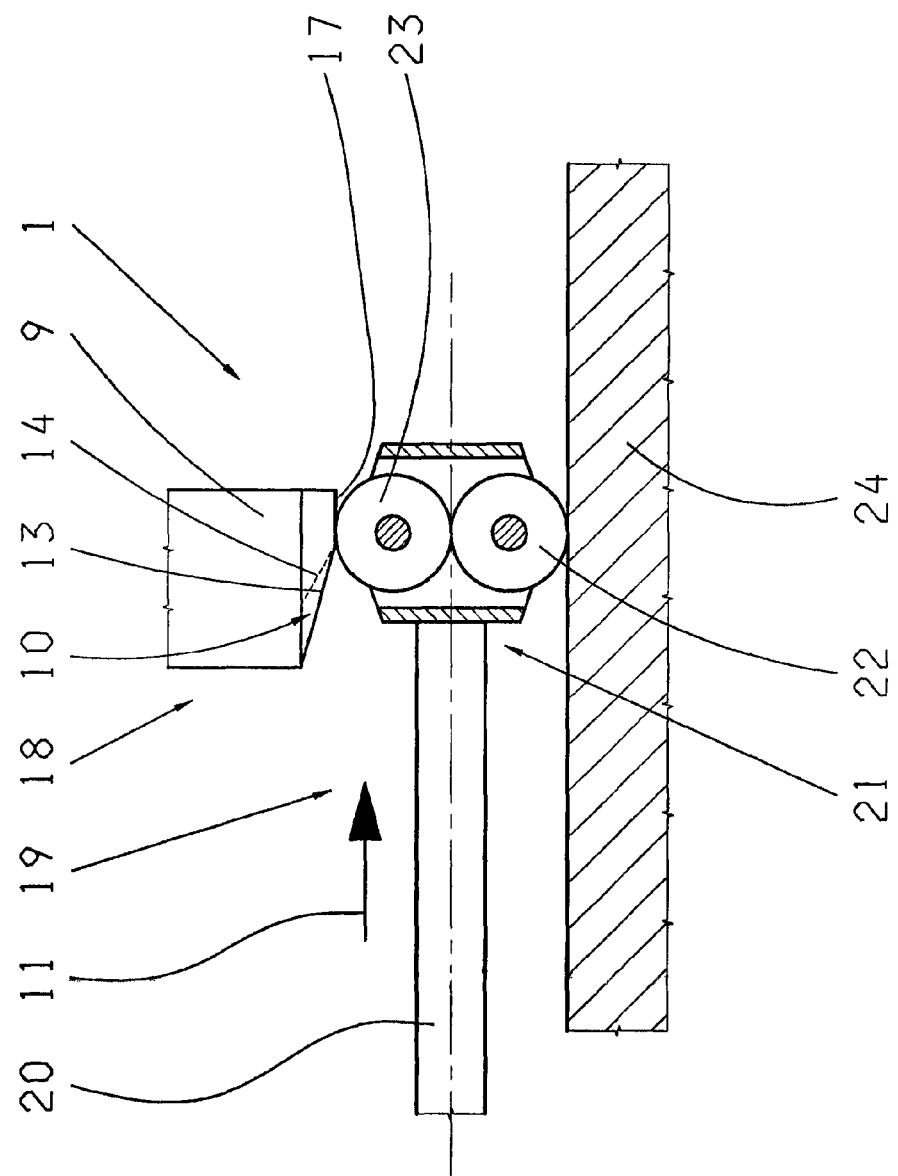
FIG. 5: The parking lock of FIG. 4, with the actuating element pushed to a third position while the pawl is pivoted into the locking position.

When the actuating element 19 is moved farther in the actuation direction 11, the second roller 23 rolls over the rear edge 16 of the ramp surface 12 and is ultimately supported against the supporting surface 17 in the third position, shown in FIG. 5. In this third position of the actuating element 19 the pawl 1 has already been pivoted to a locking position in which the detent tooth 7 is engaged in the parking lock gearwheel (not shown), so that the transmission is locked.

Indexes
1 Pawl
2 Bearing end
3 Free end
4 Bore
5 Pivot axis
6 Side of the pawl
7 Detent tooth
8 Longitudinal direction of the ramp
9 Side of the pawl
10 Ramp
11 Actuation direction of the ramp
12 Ramp surface
13 Lateral edge
14 Lateral edge
15 Front edge
16 Rear edge
17 Supporting surface
18 Parking lock
19 Actuating element
20 Push/pull rod
21 Roller assembly
22 First roller
23 Second roller
24 Housing
25 Line

The invention claimed is:

1. A transmission parking lock for a transmission, the transmission parking lock comprising:
a pawl (1) that is pivotable about a pivot axis (5);
the pawl (1) supports a ramp (10) having a helical surface (12);
an actuating element (19) that moves in an actuation direction (11) of the ramp (10) from a first position, in which the pawl (1) is in a neutral position, through a second position in which the actuating element (19) engages and biases the ramp (10) such that the pawl (1) is pivoted to an intermediate position, and to a third position in which the pawl (1) is in a locking position in which the transmission is locked by a detent tooth of the pawl (1); and
the actuating element (19) comprises at least one roller (23) which rolls along the ramp (10).

2. The transmission parking lock according to claim 1, wherein the ramp (10) has a ramp gradient which varies transversely with respect to the actuation direction (11) in a continuous manner.

3. The transmission parking lock according to claim 1, wherein the ramp (10) forms a ramp surface (12) against which the actuating element is biased.

4. The transmission parking lock according to claim 1, wherein the pawl (1) of the transmission parking lock has a bearing end (2) by which the pawl (1) is mounted to pivot about the pivot axis (5).

5. The transmission parking lock according to claim 4, wherein the ramp (10) has a ramp gradient which increases toward a side of the ramp (10) facing away from the bearing end (2) of the pawl (1).

6. The transmission parking lock according to claim 4, wherein the actuation direction (11) of the ramp (10) is parallel to the pivot axis (5) of the pawl (1).

7. The transmission parking lock according to claim 1, wherein the pawl (1) has a flat supporting surface (17) which is connected to the ramp (10) at an angle in the actuation direction (11).

8. The transmission parking lock according to claim 7, wherein the pawl (1) has a detent tooth (7) arranged on a side (9) of the pawl (1) facing away from at least one of the ramp (10) and the supporting surface (17).

9. The transmission parking lock according to claim 1, wherein the actuating element (19) is supported on a supporting surface (17) when the actuating element (19) is in the third position.

10. The transmission parking lock according to claim 1, wherein in the second position the actuating element (19) always presses against the ramp (10) along a line, regardless of the pivot position of the pawl (1).

11. The transmission parking lock according to claim 1, wherein the ramp (10) is arranged on a first side of the pawl (1) while the detent tooth is arranged on a second opposite side of the pawl (1), the pawl (1) is pivotably supported adjacent one end thereof, and the helical surface (12) forms a helical and inclined actuation surface which is engaged and biased by the actuation element (19).

12. A transmission parking lock for a transmission, the transmission parking lock comprising:
a pawl (1) being pivotable about a pivot axis (5);
the pawl (1) supporting a ramp (10) having a helical surface (12);
an actuating element (19) being movable in an actuation direction (11) of the ramp (10) from a first position, in which the pawl (1) is in a neutral position, through a second position, in which the actuating element (19) engages and biases the ramp (10) such that the pawl (1) is pivoted to an intermediate position, and to a third position, in which the pawl (1) is in a locking position in which the transmission is locked by a detent tooth of the pawl (1); and
a parking lock gearwheel is rotationally fixed to a drive output shaft of the transmission and the pawl (1), in the locking position, is engaged with the parking lock gear wheel.

13. A parking lock of a transmission, the parking lock comprising:
a pawl (1) supported at a bearing end (2) to pivot about a pivot axis (5) between a neutral position and a locked position, the pawl (1) having a first side (6) and an opposite second side (9);
a detent tooth (7) being formed in the first side (6) of the pawl (1);
a ramp (10) being formed on the second side (9) of the pawl (1) and having an actuation surface (12) that spans from a first lateral edge (13) to a second lateral edge (14), the actuation surface (12) is helical and inclined with respect to the second side (9) of the pawl (1) such that the first lateral edge (13) of the actuation surface (12) being at a first gradient angle and the second lateral edge (14)

of the actuation surface (12) being at another different angle with respect to the second side (9) of the pawl (1); and an actuation element (19) being biased, in an actuation direction (11), and contacting the actuation surface (12), and the actuation direction (11) being parallel with the pivot axis (5) of the pawl (1) such that the actuation element (19) biases the pawl (1) to pivot between the neutral position and the locked position.

14. The transmission parking lock according to claim 13, wherein the ramp comprises a ramp gradient, wherein the ramp gradient comprises the first gradient angle ($\alpha$1) formed along at the first lateral edge (13) and the another different angle ($\alpha$4) formed along the opposed second lateral edge (14) of the ramp (10), and the another different angle ($\alpha$4) is larger than the first gradient angle ($\alpha$1).

15. The transmission parking lock according to claim 14, wherein the ramp gradient comprises at least four separate gradient angles ($\alpha$1, $\alpha$2, $\alpha$3, $\alpha$4) and each gradient angle is different.

16. The transmission parking lock according to claim 14, wherein the another different angle ($\alpha$4) comprises a fourth gradient angle ($\alpha$4); wherein the ramp gradient comprises the first gradient angle ($\alpha$1), a second gradient angle ($\alpha$2), a third gradient angle ($\alpha$3), and the fourth gradient angle ($\alpha$4); and the fourth gradient angle ($\alpha$4) is greater than the third gradient angle ($\alpha$3) which is greater than the second gradient angle ($\alpha$2) which is greater than the first gradient angle ($\alpha$1), and a flat supporting surface (17) is located adjacent the of the ramp (10) for maintaining the transmission parking lock in an engaged position when the actuation element is engaged with the supporting surface (17).

17. The transmission parking lock according to claim 13, wherein the ramp (10) is arranged on a first side of the pawl (1) while a detent tooth is arranged on a second opposite side of the pawl (1), the pawl (1) is pivotably supported, and the ramp gradient, in the actuation direction (11), forms an actuation surface that is helical and inclined, and the actuation surface engages with and is biased by an actuation element.

* * * * *